C. P. HOWK.
ADJUSTABLE REAMER.
APPLICATION FILED JUNE 5, 1918.
1,290,206.
Patented Jan. 7, 1919.
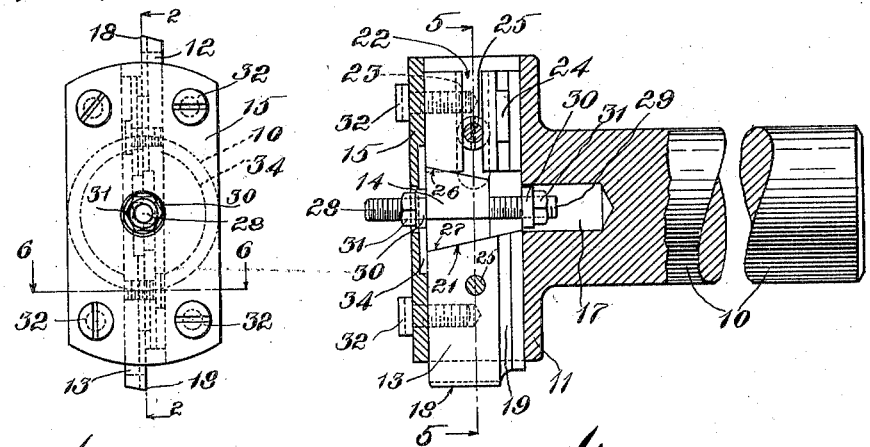
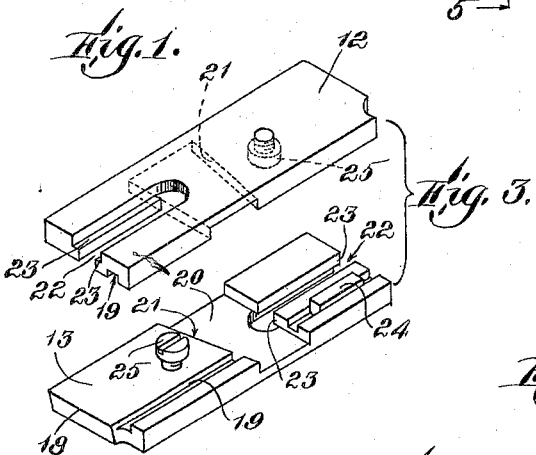
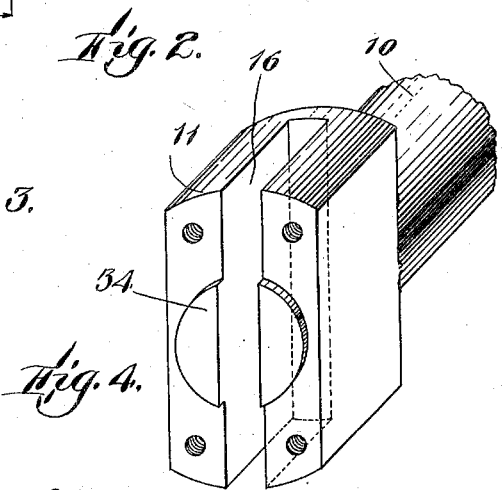
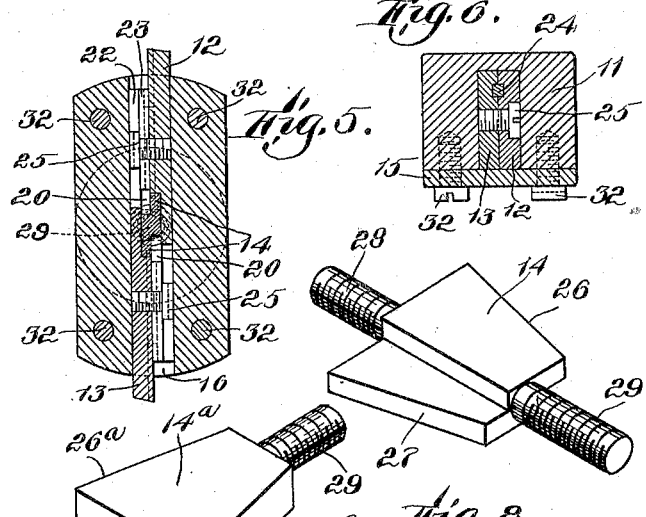
Inventor:
Charles P. Howk
By Wright, Brown, Quinby & Hay
Attorneys

UNITED STATES PATENT OFFICE.

CHARLES P. HOWK, OF WORCESTER, MASSACHUSETTS.

ADJUSTABLE REAMER.

1,290,206.

Specification of Letters Patent.

Patented Jan. 7, 1919.

Application filed June 5, 1918. Serial No. 238,314.

*To all whom it may concern:*

Be it known that I, CHARLES P. HOWK, a citizen of the United States, residing at Worcester, in the county of Worcester and State of Massachusetts, have invented new and useful Improvements in Adjustable Reamers, of which the following is a specification.

This invention relates to reamers and has for its object to furnish an adjustable reamer having certain new and useful features, including those of a pair of blades which are adjustable simultaneously, the radial arrangement of the blades with respect to the head or holder therefor, and means for mounting the blades so that they center themselves with respect to the hole being reamed yet at the same time are rigid in the directions where rigidity is required in order to properly perform their cutting function.

The preferred embodiment of my invention is shown in the accompanying drawings in which Figure 1 is an end view of my improved reamer, Fig. 2 is a longitudinal sectional view on line 2—2 of Fig. 1 showing one of the blades and the adjusting means in side elevation, Fig. 3 is a perspective view of the blades removed from the head and separated from one another, Fig. 4 is a perspective view of the head with the blades removed, Fig. 5 is a cross section of the assembled reamer on the line 5—5 of Fig. 2, Fig. 6 is a cross section on line 6—6 of Fig. 1, Fig. 7 is a perspective view of the cover plate removed from the head, Fig. 8 is a perspective view of one form of adjusting member, and Fig. 9 is a perspective view of a somewhat different form of adjusting member.

The same reference characters designate the same parts wherever they appear in the drawings.

The parts of the reamer comprise a shank 10, a head 11, blades 12 and 13, an adjuster 14 and a cover plate 15. Preferably the shank and head are made in one piece, and the head is a massive block made out of machinery steel or cast iron whereby it is sufficiently rigid, but these parts may be otherwise constructed if desired. The head is formed with a deep slot 16 extending inward from its end, and containing the axis of the shank, the walls of the slot being parallel and on opposite sides of and equally distant from a plane passing through the axis of the shank. Extending from the bottom of this slot and located centrally of the shank is a recess or chamber 17.

The blades are duplicates of one another and are made from flat bars of steel suitable for the formation of metal cutting tools. The two blades laid face to face have a combined width substantially equal to the width of the slot 16 so that they fit freely in such slot and are firmly supported during the cutting operation by the head, but are free to move endwise, that is, radially of the tool. Thus the faces of the blades which abut against one another are substantially radial to the axis of the tool. For convenience of description those faces or sides of the tools which bear against one another and are approximately in the diametral plane of the tool are called the inner faces. The cutting edge 18 of each blade is formed by the intersection of such inner face with the end of the blade, and is made sharp and maintained thus by grinding away such end, the end thus ground being beveled according to the usual practice sufficiently to provide clearance for the blade.

In the inner face of each blade is formed a longitudinal groove 19 which serves as a keyway, and a transverse channel 20 which is formed to receive the adjuster 14, one side of which, designated 21, is inclined. There is also formed in the end of the blade opposite to the cutting edge a longitudinal slot 22 which is made wider on the outer side so as to provide ledges or lips 23 adapted to embrace the shank and pass under the head of the screw or stud presently described. In the keyway of each blade adjacent to the slotted end thereof is set a key 24, and into the inner face of the said blade at the opposite side of the channel from the slot 22 20 is set a stud 25, the latter having a shank which enters the blade and having a head moved sufficiently from the surface of the blade to admit the ledges 23 of the other blade between the head and such surface. Conveniently such stud is made as a screw, the shank of which is threaded and enters a tapped hole in the blade, being thereby adjustable so as to bind the blades together when they have been assembled in the manner presently described. In assembling the blades they are laid one upon the other with their inner surfaces in contact and their cutting edges projecting oppositely to one another, and the key of each is entered into the keyway of the other. At this time they are so placed that the slotted end of each is between the stud 25 and the slotted end of the other. The blades having been placed together in this manner are then moved longitudinally one upon the other to cause the stud 25 of each to enter the slot 23 of the other, the ledges of the slot passing then under the head of the stud. Upon then screwing down the studs the blades may be clamped together. When the blades have been thus assembled the transverse channels 20 form a single passageway and the inclined edges 21 are at the opposite sides of this passageway. The adjuster 14 is placed in the passageway so formed. This adjuster is in the form of a double wedge having an inclined edge 26 at one side adapted to bear against the inclined edge 21 of the channel in one of the blades, as, for instance, the blade 12, and an oppositely inclined edge 27 adapted similarly to bear against the inclined edge of the channel in the other blade. Threaded stems 28 and 29 project from the ends of the wedge. In the form of the adjuster shown in Fig. 8 the construction is essentially that of two wedges, each having an inclined edge and an edge which is parallel to the stems, these wedges being overlapped and each being substantially equal in thickness to the depth of the channel in the blade which it occupies; the central part having twice the thickness of those parts which project to opposite sides and are formed with the inclined edges. If desired, however, the wedge may be made as shown in Fig. 9, where it is of uniform thickness throughout and the opposite edges of which are oppositely inclined.

On each of the stems 28 and 29 of the wedge are placed a washer 30 and a nut 31, the washer being of greater diameter than the width of the combined transverse passageway and bearing upon the adjacent part of the blades, and the nut being screwed on the shank. The blades and adjuster, when assembled as described, are placed in the slot in the head with the stem 29 and its washer and nut projecting into the chamber 17. The cover plate 15 is placed on the head outside of the blades and secured in a readily removable manner by bolts 32. This cover plate retains the blades in the slot and has a central hole 33 into which the stem 28 and the washer and nut thereof may be entered. Both this hole and the chamber 17 are greater in width than the washers which enter them by an amount sufficient to permit as great endwise movement of the blades as may be necessary to center the latter in the hole which is being reamed.

On the outer end of the head is formed a shallow cylindrical boss 34 which is intersected by the slot 16 and enters a complemental depression 35 in the inner surface of the cover plate 15. This boss is adapted to locate the cover member centrally.

It will have become evident from the foregoing description that when the blades are placed in the head in the manner described, they are located symmetrically with respect to the axis of the tool and their cutting edges project at diametrically opposite sides of the tool; and also that the inner faces of the blades are radial; while the solid masses of the head on opposite sides of the slot apply force to the blades in the cutting direction and hold them up to their work with such firmness and rigidity as to make impossible any such effect as chattering of the blades.

It will be evident also that the tool is adjustable to ream holes differing in diameter through a wide range, for the blades may be set by means of the adjuster 14 to project more or less from the head. In order to make the necessary adjustments of the blades they are withdrawn from the head after the cover plate has first been removed, and their cutting edges are forced apart from one another as far as may be required by alternately taking up the nut or stem 29 of the adjuster and slacking off the nut on stem 28. As this adjustment is made by means of screw threads, it is evident that a very fine and accurate adjustment may be secured. In case adjustment to a smaller diameter of hole than that for which the blades have already been set is required, the blades are first placed with their cutting edges nearer together than the diameter of the hole and are then spread apart to the required distance by actuation of the adjuster as described. In making these adjustments the screw studs 25 are, of course, slackened sufficiently to admit of the blades slide readily past one another, and after completion of the adjustment such studs may be tightened up if desired, although this is not always necessary because the adjuster, with the nuts on the stems thereof, provides a rigid abutment which prevents the resistance of the work from forcing the cutting edges inwardly. The extent of adjustment is measured by a proper gage or micrometer caliper, and when effected the blades are placed in the head and the cover plate is put in place.

Since the adjuster acts equally and oppositely on both blades, only one adjustment is necessary in order to put both cutting edges in their proper positions; while by reason of the fact that the holes 17 and 33 which receive the stems of the adjuster are larger than the latter or the washers thereon, the blades have a floating relation to the head which enables them to adjust themselves to the hole so that both will act with equal effect in case there is any minor variation in the lengths of the respective blades, that is, as to the distance of their respective cutting edges from the surfaces on which the adjuster acts.

In addition to the last noted characteristics, this invention has the advantage that the adjustments so made are positively maintained and they cannot be altered accidentally by the resistance of the work. This is due to the fact that the angle between the axis of the reamer and the inclined abutting faces of the blades and adjuster is small, (in one form which I have made the value of this angle is 15 degrees) so that the component of force applied through the blades to the adjuster is small, and may be less than enough to overcome the friction of the abutting surfaces. But independently of this, the adjusting nuts on the stems of the adjuster bear against the sides of the blades so that accidental movement of the adjuster is in any case impossible.

Another advantage is that the holding force, when the reamer is held stationary with respect to a rotating work piece, or the driving power, when the reamer is driven rotatably, is applied to the blades unyieldingly, due to the massive construction of the head and to the fact that the width of the head is nearly as great as the length of the blades, so that pressure is applied to the blades at points near their cutting edges.

The advancing faces of the blades are substantially radial to the tool and the angle of their cutting edges is slightly less than a right angle, being enough less to provide proper clearance. This is the ideal condition in a reamer blade, giving sufficient strength to the cutting edge and at the same time making the edge sharp enough to cut efficiently; and the blade thus arranged cannot chatter.

The two blades with the interposed adjuster form a cutting unit adapted to be inserted in the head as such, that is, without being first mounted in a separate holder. This results in the effect previously described, that one adjustment serves to set both blades equally and oppositely, and in making it possible to adjust the blades rapidly and easily.

The floating manner in which the blades are mounted in the head, that is, their capacity for moving endwise, as previously described, makes the blades self-adjusting to the hole to be reamed, not only in the case of variations in the blades themselves, but also in case the axis of the tool should not be accurately alined with the axis of the hole.

It is to be understood, of course, that all mechanical variations embodying equivalent ideas of means to those hereinbefore described and hereinafter pointed out in the claims, to accomplish the same or like results, are all within the scope of the protection which I claim, and that such protection is not restricted to the specific details here shown.

What I claim and desire to secure by Letters Patent is:—

1. An adjustable reamer comprising a head having a blade holding slot, a pair of blades arranged face to face occupying said slot, said blades having transverse channels in their abutting faces of which the side toward the cutting edge in each blade is inclined, an adjuster having wedge faces engaged with the inclined sides of said channels for adjusting said blades simultaneously and oppositely, and holding means for said adjuster bearing on the blades adjacent to the ends of said channels to prevent displacement of the adjuster.

2. An adjustable reamer comprising a head having a slot, a pair of blades arranged face to face with their respectively opposite ends projecting from the opposite ends of the slot and having cutting edges, each of the blades having a transverse channel in the face next to the other, which channels merge into a passageway between the blades, one side of the channel in each blade being inclined, and said inclined sides in the two blades being opposite to one another, a wedge adjuster occupying said passageway and having inclined surfaces bearing on said inclined sides and having stems projecting from each end of the passageway, and nuts threaded on said stems bearing against the blades for adjusting and retaining said adjuster.

3. An adjustable reamer comprising a head having a slot, a pair of blades arranged face to face with their respectively opposite ends projecting from the opposite ends of the slot and having cutting edges, each of the blades having a transverse channel in the face next to the other, which channels merge into a passageway between the blades, one side of the channel in each blade being inclined, and said inclined sides in the two blades being opposite to one another, a wedge adjuster occupying said passageway and having inclined surfaces bearing on said inclined sides and having stems projecting from each end of the passageway, nuts threaded on said stems bearing against the blades for adjusting and retaining said adjuster, and a cover member attached to the head overlying said slot and retaining the blades therein, said cover and the head having recesses which are entered by said stems and the nuts thereon and being enough wider than the stem to permit endwise movement of the blades relatively to the head.

4. A pair of duplicate adjustable reamer blades each having on one end a cutting edge and in one face a transverse channel and a longitudinal keyway, said channel having an inclined bounding face, each blade having also a slot or notch with flanking ledges opening inward from the end opposite to that which carries the cutting edge, a stud projecting from the afore-mentioned face of each blade into the slot of the other blade and having a head coöperating with the ledges of the slot to clamp the blades together, and a key set into the keyway of each blade near one end, and fitting slidingly the keyway of the other blade.

5. A complimental pair of adjustable reamer blades having abutting surfaces in contact and having cutting edges on their respectively opposite ends, means for holding said blades together arranged to permit movement of each longitudinally of the other, each blade having in the side next to the other a channel with an inclined bounding edge and an expander occupying said channel and having inclined surfaces which bear upon the opposite inclined surfaces of the respective blades, and means for moving said expander so as to adjust said blades to vary the distance between their cutting edges, said adjuster having stems on opposite ends projecting from the blades, and nuts threaded on said stems respectively arranged to bear on the adjacent sides of the blades for shifting said adjuster and maintaining the adjustments thereof.

6. A complemental pair of reamer blades each having a cutting edge on one end and being arranged face to face with the cutting edge of one disposed at the end remote from the cutting edge of the other, a headed stud on one blade projecting through a slot in the other blade and bearing on ledges in said slot whereby to connect the blades together and guide their relative movement, a key on one blade projecting into a keyway in the other for additionally guiding such relative movement, and an adjuster arranged between the blades, the latter having channels which together form a passageway containing such adjuster, the channel in one blade having an inclined boundary at one side, and that in the other blade having an inclined boundary at the other side, and the adjuster having inclined surfaces to bear upon said boundaries and thereby adjust the blades in consequence of its movements.

In testimony whereof I have affixed my signature.

CHARLES P. HOWK.

Copies of this patent may be obtained for five cents each, by addressing the "Commissioner of Patents, Washington, D. C."